United States Patent

Murrish et al.

[11] Patent Number: 5,163,341
[45] Date of Patent: Nov. 17, 1992

[54] CRANKSHAFT WITH LUBRICATION PASSAGES

[75] Inventors: Dale E. Murrish; Thomas M. Briolat, both of Troy; Mark D. Griffin, Berkley, all of Mich.

[73] Assignee: General Motors Corporation, Detroit, Mich.

[21] Appl. No.: 773,340

[22] Filed: Oct. 8, 1991

[51] Int. Cl.$^5$ .............................. F16C 3/04; F16C 3/11
[52] U.S. Cl. ......................................... 74/595; 74/605; 123/196 R; 184/6.5
[58] Field of Search ................ 74/595, 596, 597, 598, 74/599, 600, 601, 602, 603, 604, 605; 123/41.34, 41.35, 41.37, 196 R; 184/6.5; 384/288

[56] References Cited

U.S. PATENT DOCUMENTS

| | | | |
|---|---|---|---|
| 1,289,903 | 12/1918 | Pogue | 184/6.5 |
| 1,292,312 | 1/1919 | Gronkwist | 184/6.5 |
| 1,348,664 | 8/1920 | Richard | 74/605 X |
| 1,872,365 | 8/1932 | Underwood | 184/6.5 |
| 2,063,885 | 12/1936 | Underwood | 184/6.5 |
| 2,230,893 | 2/1941 | Bachle | 123/196 R X |
| 2,680,494 | 6/1954 | Dickson | 184/6 |
| 2,723,003 | 11/1955 | Antonsen | 184/6 |
| 2,728,331 | 12/1955 | Louzecky et al. | 123/41.38 |
| 2,899,015 | 8/1959 | Leach et al. | 184/6 |
| 2,917,946 | 12/1959 | Fritz | 74/596 |
| 2,983,335 | 5/1961 | Etchells et al. | 184/6 |
| 2,988,081 | 6/1961 | Etchells et al. | 123/196 R |
| 3,748,925 | 7/1973 | Stewart | 74/603 |
| 3,768,335 | 10/1973 | Mayer | 74/597 |
| 3,785,459 | 1/1974 | Patchen | 184/6.5 |
| 3,842,938 | 10/1974 | Barnes-Moss | 184/6.5 |
| 4,345,797 | 8/1982 | Ballheimer | 184/6.5 X |
| 4,534,241 | 8/1985 | Remmerfelt et al. | 74/597 |
| 4,622,933 | 11/1986 | Fukuo et al. | 123/196 R |
| 4,928,550 | 5/1990 | Sakai et al. | 74/595 |

FOREIGN PATENT DOCUMENTS

| | | | |
|---|---|---|---|
| 197804 | 4/1978 | Fed. Rep. of Germany | 184/6.5 |
| 58-211518 | 12/1983 | Japan | 184/6.5 |
| 1393950A1 | 5/1988 | U.S.S.R. | |
| 1449720A1 | 1/1989 | U.S.S.R. | |

Primary Examiner—Allan D. Herrmann
Assistant Examiner—David W. Laub
Attorney, Agent, or Firm—Gordon F. Belcher

[57] ABSTRACT

A crankshaft for a V-type engine comprises an intermediate main journal which is rotatably supported in a main bearing, a primary crankpin, a pair of crankarms, and a second crankpin. The intermediate main journal has a primary boundary plane extending between the longitudinal axis of the intermediate main journal and the outer surface of the intermediate main journal. The intermediate main journal also has a secondary boundary plane extending between the longitudinal axis of the intermediate main journal to the outer surface of the intermediate main journal. A main cross passage extends through the intermediate main journal. The main cross passage is contained in a radial plane of the intermediate main journal. The main cross passage is oriented with respect to the primary and secondary crankpins so that the ends of the main cross passage are between the sides of the primary and secondary boundary planes which face the primary crankpin. A primary connecting passages extends from the main cross passage through the one crankarm to the outer surface of the primary crankpin.

4 Claims, 5 Drawing Sheets

FIG I

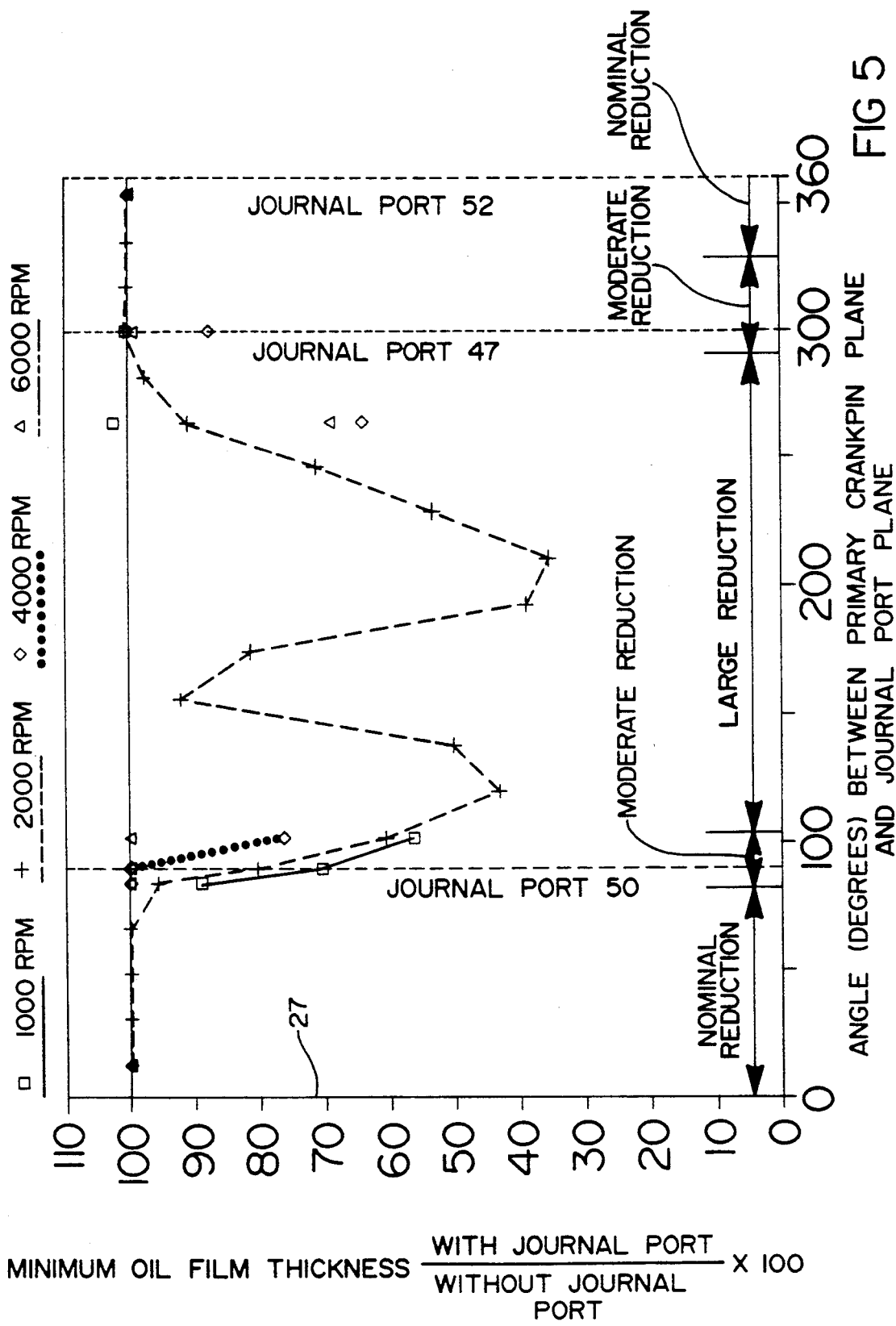

5,163,341

CRANKSHAFT WITH LUBRICATION PASSAGES

TECHNICAL FIELD

This invention relates to a crankshaft with lubrication passages for use in a V-type engine and, more particularly, to a cross passage through a main journal of a crankshaft which is located to reduce the disturbance to the oil film between the main journal and main bearing produced by registry of the cross passage with the oil film.

BACKGROUND

Crankshafts ordinarily have main journals which are supported in main bearings and radial crankarms which connect the ends of the main journals to the ends of crankpins. One or more of the main journals can have a main cross passage communicating with a connecting passage which extends through a crank arm to the the outer surface of a crankpin. A portion of the oil film which surrounds each main journal can flow into the main cross passage from where it is supplied to the connecting passage. The oil can then flow through the connecting passage to the outer surface of the crankpin for lubrication. The flow of oil from the outer surface of the main journal into the main cross passage can cause a reduction in the minimum oil film thickness between the main journal and main bearing.

SUMMARY OF THE INVENTION

The present invention provides a crankshaft for a V-type engine having an intermediate main journal which is rotatably supported in a main bearing, a primary crankpin, a pair of crankarms, and a secondary crankpin. The intermediate main journal has a primary boundary plane extending between the longitudinal axis of the intermediate main journal and the outer surface of the intermediate main journal. The intermediate main journal also has a secondary boundary plane extending between the longitudinal axis of the intermediate main journal to the outer surface of the intermediate main journal. A main cross passage extends through the intermediate main journal. The main cross passage is contained in a radial plane of the intermediate main journal. The main cross passage is oriented with respect to the primary and secondary crankpins so that the ends of the main cross passage are between the sides of the primary and secondary boundary planes which face the primary crankpin. A primary connecting passage extends from the main cross passage through the one crankarm to the outer surface of the primary crankpin. Locating the ends of the main cross passage between the primary and secondary boundary planes results in either little or no reduction, or a moderate reduction in the minimum oil film thickness during most engine speeds.

BRIEF DRAWING DESCRIPTION

In the drawings:

FIG. 5 is a graph showing the effect on the oil film thickness around the main journal of FIGS. 2-4 of the hole location on the outer surface of the crankpin of FIGS. 2-4;

Figure 7:
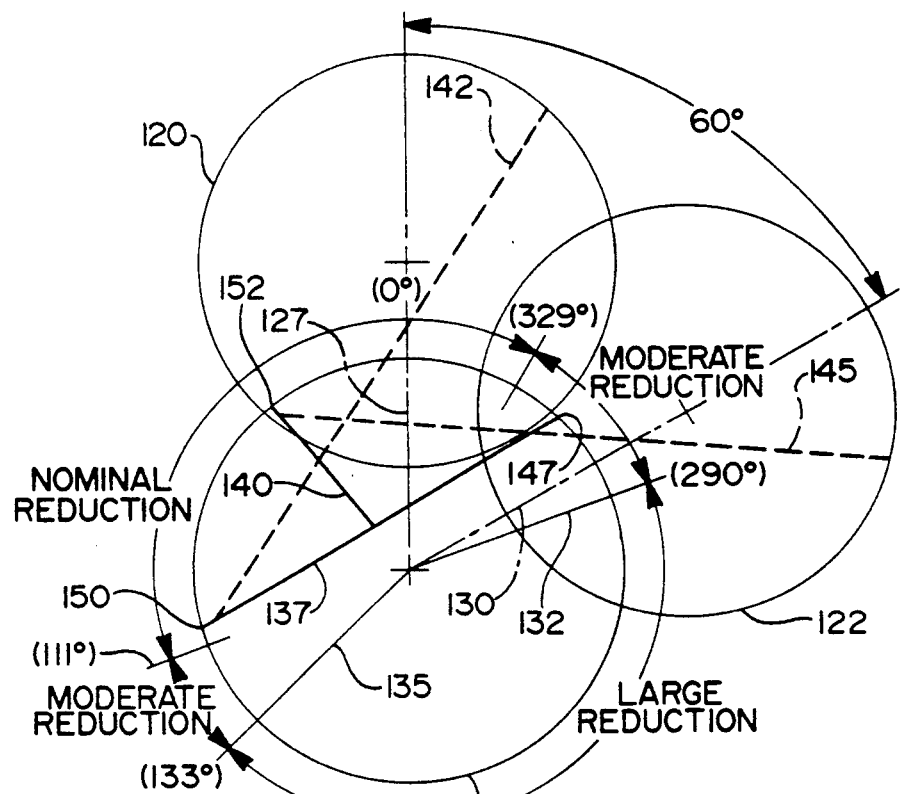
Figure 8:
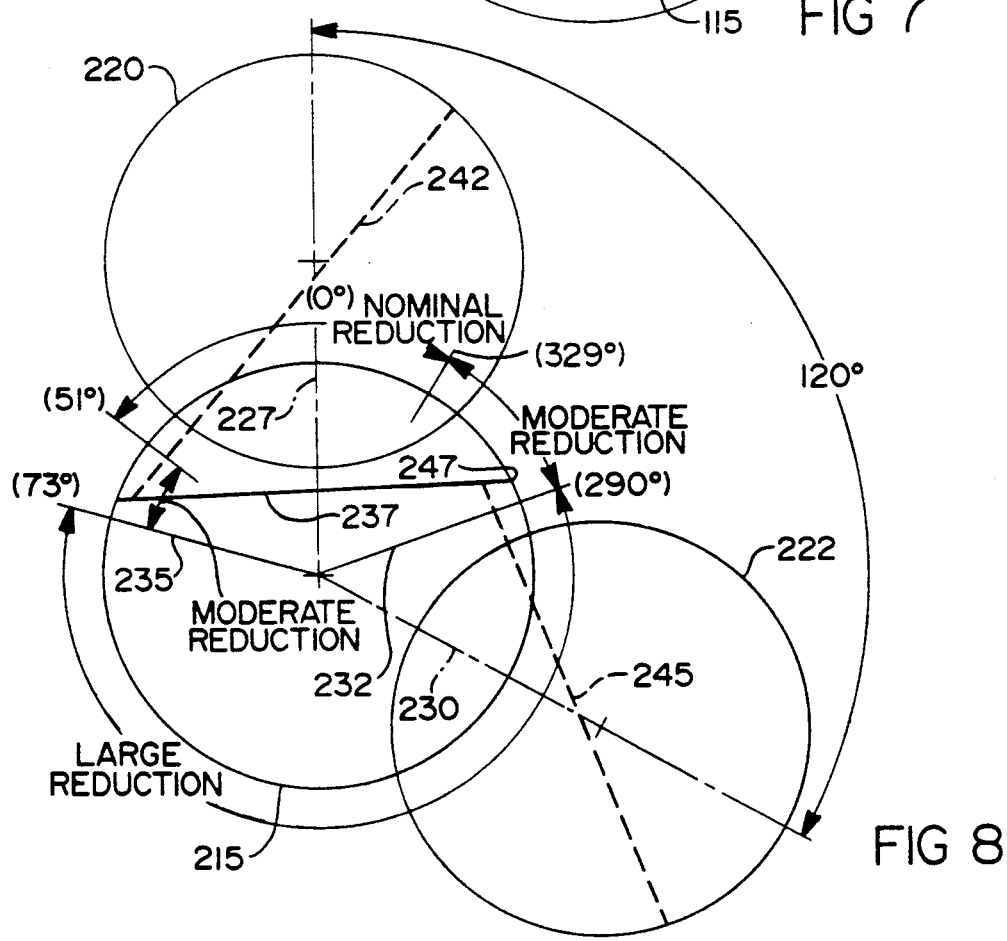

FIG. 7 is a schematic view of a main journal of a second embodiment of the present invention and also showing both of the adjacent crankpins and the 60 degree orientation between them, and the location of the main cross passage and supplemental main passage with respect to the condition of the oil film which encircles the main journal; and FIG. 8 is a schematic view of a main journal of a third embodiment of the present invention and also showing both of the adjacent crankpins and the 120 degree orientation between them, and the location of the main cross passage and supplemental main passage with respect to the condition of the oil film which encircles the main journal.

Corresponding reference characters indicate corresponding parts throughout the several views of the drawings.

DETAILED DESCRIPTION

Figure 1:
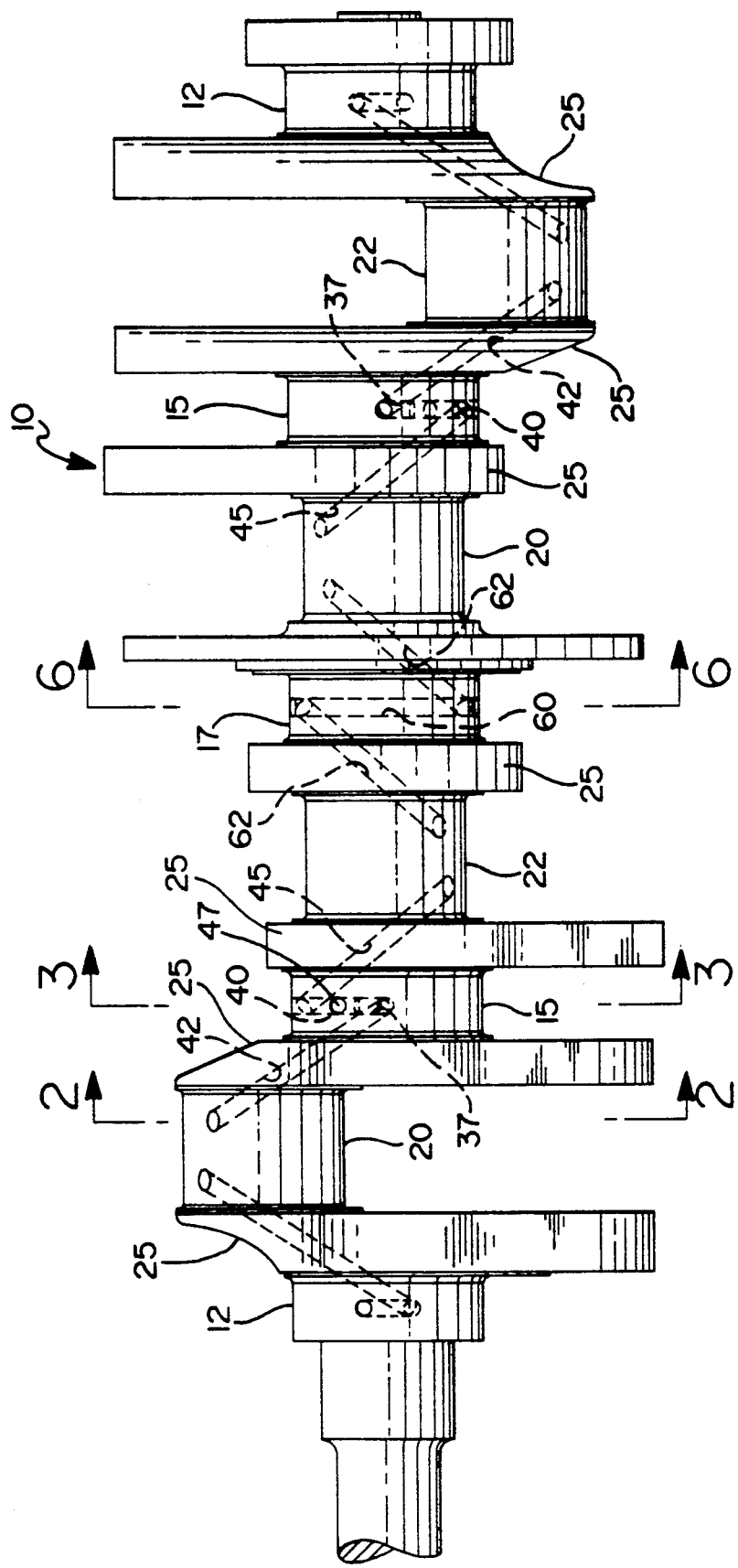
FIG. 1 is a longitudinal view of a crankshaft of the present invention.

Referring to the drawings, and in particular, FIG. 1, numeral 10 generally refers to a crankshaft of the present invention for a V-type engine. The crankshaft 10 comprises a pair of end main journals 12, a pair of intermediate main journals 15, and a central main journal 17. The diameter of each journal 12,15,17 is approximately 64 mm. The longitudinal axes of the main journals 12,15,17 are coaxial and each main journal is rotatably supported in a main bearing which is mounted in a cylinder block. Each main bearing comprises an upper half having a groove on its inner surface, and a lower half without such a groove.

The crankshaft 10 further comprises a pair of primary crankpins 20, a pair of secondary crankpins 22 and a plurality of crankarms 25. The crankarms 25 extend away from the ends of the main journals 12,15,17 in the radial direction to the ends of the primary and secondary crankpins 20,22. Each intermediate main journal 15 is disposed between a primary and secondary crankpin 20,22. The longitudinal axes of the crankpins 20,22 are parallel to the longitudinal axes of the main journals 12,15,17 with the crankarms 25 being perpendicular to the longitudinal axes of the main journals 12,15,17 and crankpins 20,22.

Figure 2:
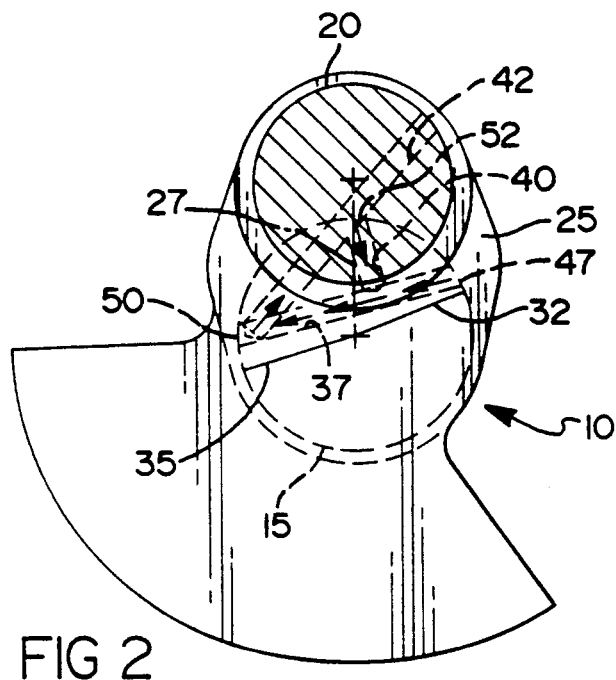
FIG. 2 is a sectional elevational view of the crankshaft of FIG. 1 generally in the plane indicated by line 2—2 of FIG. 1 showing the oil flow direction through the main cross passage and supplemental main passage into an adjoining connecting passage.
Figure 3:
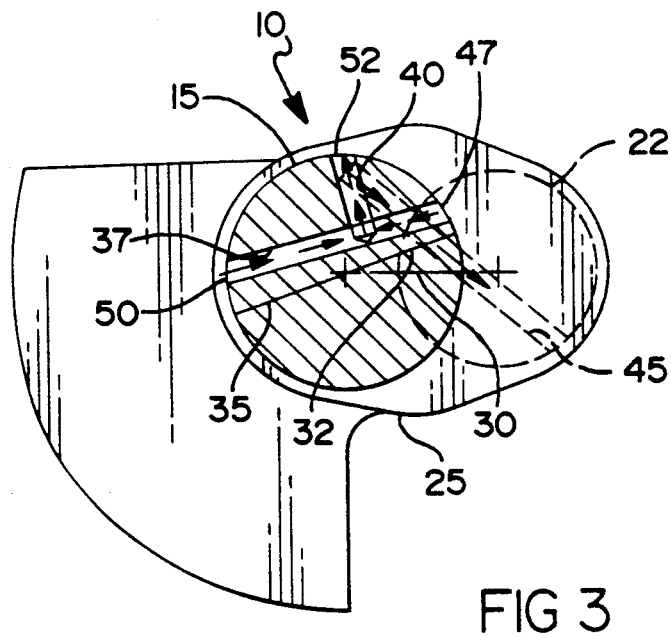
FIG. 3 is a sectional elevational view of the crankshaft of FIG. 1 generally in the plane indicated by line 3—3 of FIG. 1 showing the oil flow direction through the main cross passage and supplemental main passage into the other adjoining connecting passage.
Figure 4:
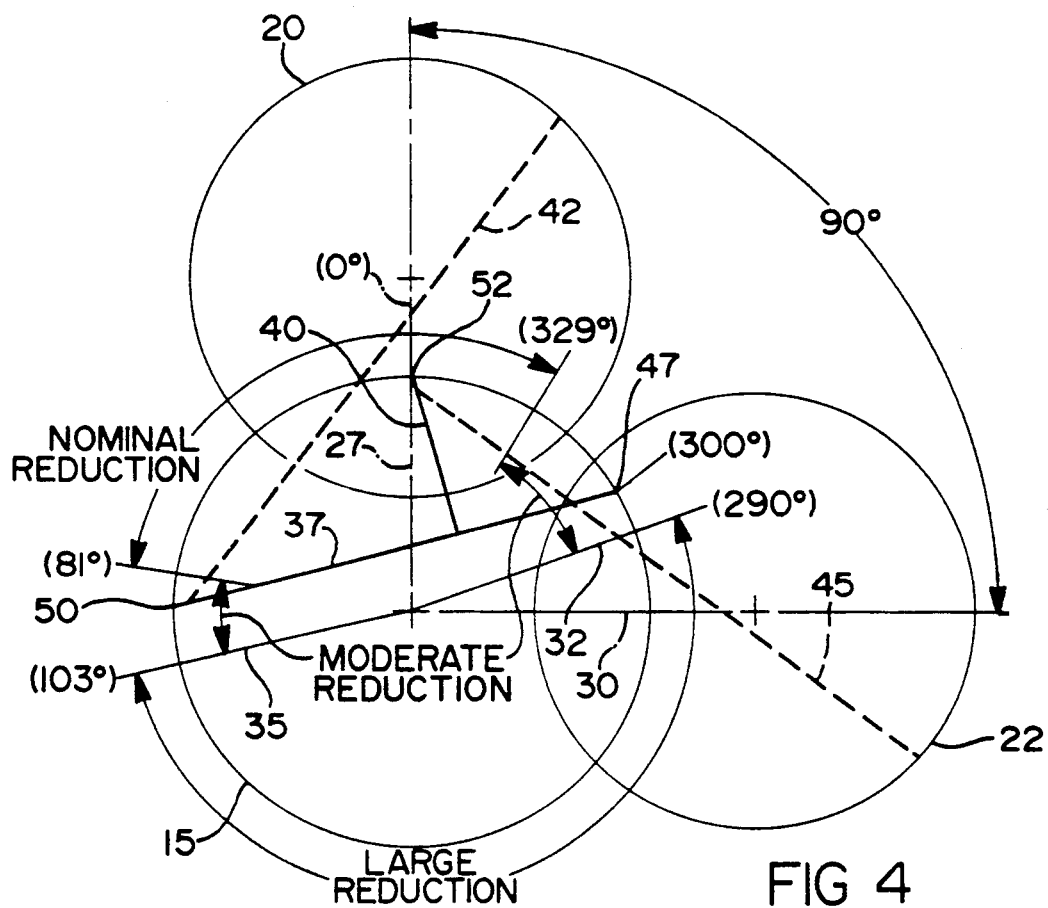
FIG. 4 is a schematic view of the main journal of FIG. 2 and also showing both of the adjacent crankpins and the 90 degree orientation between them, and the location of the main cross passage and supplemental main passage with respect to the condition of the oil film which encircles the main journal.

As shown in FIGS. 2 and 4, each of the primary crankpins 20 has a primary crankpin plane 27 extending between the longitudinal axes of the primary crankpin 20 and intermediate main journal 15. As shown in FIGS. 3 and 4, each of the secondary crankpins 22 has a secondary crankpin plane 30 extending between the longitudinal axes of the secondary crankpin and intermediate main journal 15. The primary and secondary crankpins 20,22 are oriented with respect to one another so that the angle between the primary and secondary crankpin planes 27,30 is approximately 90 degrees.

As shown in FIGS. 2 and 4, the intermediate main journal 15 has a primary boundary plane 32 extending between the longitudinal axis of the intermediate main journal and the outer surface of the intermediate main journal. The primary boundary plane 32 is disposed between the primary and secondary crankpin planes 27,30. The primary boundary plane 32 forms an angle of approximately 70 degrees with the primary crankpin plane 27.

As shown in FIGS. 3 and 4, the intermediate main journal 15 has a secondary boundary plane 35 extending between the longitudinal axis of the intermediate main journal 15 to the outer surface of the intermediate main journal 15. The secondary boundary plane 35 is disposed between the sides of the primary and secondary crankpin planes 27,30 which face away from the primary boundary plane 32. The angle between the secondary boundary plane 35 and primary crankpin plane 27 is equal to approximately 103 degrees.

A main cross passage 37 extends through the intermediate main journal 15. Each of the main cross passages 37 has opposite ends comprising journal ports 47,50 which communicate with the outer surface of the intermediate main journal. The main cross passage 37 is contained in a radial plane of the intermediate main journal 15 through which it is formed. The main cross passage 37 is oriented with respect to the adjacent primary and secondary crankpins 20,22 so that the ends of the main cross passage 37 are between the sides of the primary and secondary boundary planes 32,35 which face the primary crankpin 20.

A supplemental main passage 40 extends from the main cross passage 37 to the portion of the outer surface of the intermediate main journal 15 between the sides of the primary and secondary boundary planes 32,35 which face the primary crankpin 20. The end of the supplemental main passage 40 which communicates with the outer surface of the intermediate main journal 15 comprises a journal port 52. The supplemental main passage 40 is preferably perpendicular to the main cross passage 37 to facilitate drilling of the passages. It is possible for the supplemental main passage 40 to be oblique with respect to the main cross passage 37.

A primary connecting passage 42 extends from the main cross passage 37 through the crankarm 25 to the outer surface of the primary crankpin 20. A secondary connecting passage 45 extends from the supplemental main passage 40 through the crankarm 25 to the outer surface of the secondary crankpin 22. It is preferable for the connecting passages 42,45 to intersect the main cross passage 37 and supplemental main passage 40 away from surface of the intermediate main journal 15 to limit the size of the journal ports 47,50,52.

OPERATION

During engine operation, the intermediate main journal 15 rotates so that, when the intermediate main journal is viewed along its longitudinal axis with the shortest angular distance from the primary crankpin 20 to the secondary crankpin 22 being in a clockwise direction as in FIGS. 2-4, the intermediate main journal 15 rotates in a clockwise direction.

Also, during engine operation, oil is fed to the groove on the inner surface of the upper half of each main bearing. As shown in FIGS. 2 and 3, oil flows from the oil groove in the upper half of the main bearing which supports the intermediate main journal 15 into the journal ports 47,50,52 when the ports register therewith. Oil flows through the journal ports 47,50,52, into the main cross passage 37 and supplemental main passage 40.

Oil in the main cross passage 37 and supplemental main passage 40 flows into the primary and secondary connecting passages 42,45 as shown in FIGS. 2 and 3. Oil in the primary and secondary connecting passages 42,45 flows to the outer surface of the primary and secondary crankpins 20,22 for lubrication of the bearings disposed between the primary and secondary crankpins and the connecting rods connected to them.

FIG. 5 shows how the position of the journal ports 47,50,52 around the circumference of the intermediate main journal 15 affects the minimum thickness of the oil film between the intermediate main journal and the main bearing which supports it (i.e., the minimum film thickness). The "journal port plane" is a radial plane which extends between the longitudinal axis of the intermediate main journal 15 and a journal port on the intermediate main journal 15. The angle is measured in the counterclockwise direction from the primary crankpin plane 27 of FIG. 4. The effect on the minimum film thickness is shown for four different engine speeds.

The region of FIG. 5 labeled "nominal reduction" represents the arc shaped portion of the outer surface of the intermediate main journal 15 on which location of a journal port causes little or no reduction in the minimum film thickness during most engine speeds. The regions of FIG. 5 which are labeled "moderate reduction" represent the arc shaped portions of the outer surface of the intermediate main journal 15 on which location of a journal port causes a moderate reduction in the minimum film thickness during most engine speeds. The region of FIG. 5 labeled "large reduction" represents the arc shaped portion of the outer surface of the intermediate main journal 15 on which location of a journal port causes a large reduction in the minimum film thickness during most engine speeds. The arc shaped portions of the intermediate main journal 15 which correspond to these regions are shown in FIG. 4.

The primary and secondary boundary planes 32,35 coincide with the boundaries of the region of "large reduction." Since the journal ports 47,50,52 are located between the sides of these planes 32,35 which face the primary crankpin 20, the journal ports 47,50,52 are not within the region of "large reduction".

It is preferable to locate the journal ports 47,50,52 in the region of "nominal reduction", though that is not always possible because of other considerations which bear upon the location of the journal ports 47,50,52. For example, it is desirable for the main cross passage 37 and supplemental main passage 40 to be away from the longitudinal axis of the intermediate main journal 15 since centrifugal force opposes the oil flow through these passages. But increasing the distance of the main cross passage 37 from the longitudinal axis of the intermediate main journal 15 decreases the time during which the journal ports 47,50,52 are in registry with the oil groove in the upper half of the main bearing.

It is also desirable for the primary and secondary connecting passages 42,45 to be away from the longitudinal axis of the intermediate main journal 15 since centrifugal force opposes the oil flow through these passages. Also, the primary and secondary connecting passages 42,45 should be away from the fillets between the crankarms 25 and the intermediate main journal 15, and away from the fillets between the crankarms and the primary and secondary crankpins 20,22.

CENTRAL MAIN JOURNAL

Figure 6:
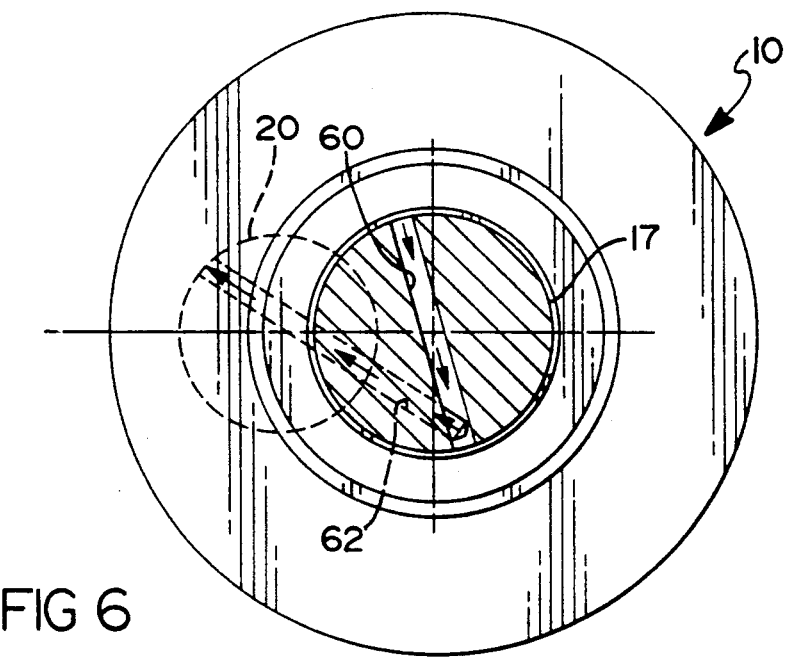
FIG. 6 is a sectional elevational view of the crankshaft of FIG. 1 generally in the plane indicated by line 6—6 of FIG. 1 showing a diametrical cross passage.

As shown in FIG. 6, the central main journal 17 has a diametrical central cross passage 60 and a central connecting passage 62 which extends from the central cross passage through the adjoining crankarm 25 to the outer surface of the adjacent primary crankpin 20. The central main journal 17 has a second central connecting passage 62 (shown in FIG. 1, but not in FIG. 6) which extends from the central cross passage 55 through the other adjoining crankarm 25 to the outer surface of the adjacent secondary crankpin 22. As shown in FIG. 6, oil flows from oil film between the central main journal 17 and main bearing which supports it, into the central cross passage 60. Oil in the central cross passage 60 flows into the central connecting passages 62 to the outer surfaces of the primary and secondary crankpins 20,22 for lubrication of the bearings disposed between them and the connecting rods connected to them. It is preferable for the central connecting passages 62 to intersect the central cross passage 60 away from the surface of the central main journal 17 to limit the cross sectional area of the ends of the central cross passage.

ALTERNATIVE EMBODIMENTS

FIG. 7 is a schematic view of an intermediate main journal 115 of a second embodiment of the crankshaft 110. Parts similar to those shown in FIGS. 1-5 have the same reference numeral with the addition of the prefix 100. In this embodiment, the angle between the primary and secondary crankpin planes 127,130 is approximately 60 degrees.

FIG. 8 is a schematic view of an intermediate main journal 215 of a third embodiment of the crankshaft 210. Parts similar to those shown in FIGS. 1-5 have the same reference numeral with the addition of the prefix 200. In this embodiment, the angle between the primary and secondary crankpin planes 227,230 is approximately 120 degrees.

The angular positions of the boundaries of the regions of "nominal reduction", "moderate reduction" and "large reduction" which are farthest from the secondary crankpin, e.g., 22, vary depending upon the angle between the primary and secondary crankpin planes e.g., 27,30, as shown in FIGS. 4, 7 and 8. The angular position of the secondary boundary plane, e.g., 35, is therefore dependent upon the angle between the primary and secondary crankpin planes e.g., 27,30. The angle, in degrees, between the secondary boundary plane, e.g., 35, and primary crankpin plane, e.g., 27, is equal to approximately 193 minus the angle, in degrees, between the primary and secondary crankpin planes, e.g., 27,30. The angle, in degrees, between the primary crankpin plane, e.g., 27, and a plane extending from the longitudinal axis of the intermediate main journal, e.g., 15, to the boundary between the regions of "some reduction" and "nominal reduction" is equal to approximately 171 minus the angle, in degrees, between the primary and secondary crankpin planes, e.g., 27,30. The angle, in degrees, between the primary and secondary crankpin planes 27,30 is between approximately 45 and 135 degrees.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The embodiments of the invention in which an exclusive property or privilege is claimed are defined as follows:

1. A crankshaft for a V-type engine comprising:
   an intermediate main journal which is rotatably supported in a main bearing;
   a primary crankpin which is parallel to said intermediate main journal, said primary crankpin having a primary crankpin plane extending between the longitudinal axes of said primary crankpin and intermediate main journal;
   a pair of crankarms, one of said crankarms extending between said intermediate main journal and primary crankpin;
   a secondary crankpin which is parallel to said intermediate main journal, said secondary crankpin having a secondary crankpin plane extending between the longitudinal axes of said secondary crankpin and intermediate main journal;
   the other of said crankarms extending between said intermediate main journal and secondary crankpin, said primary and secondary crankpins being oriented with respect to one another so that the angle, in degrees, between said primary and secondary crankpin planes is between approximately 45 and 135 degrees;
   said intermediate main journal being adapted to rotate so that, when said intermediate main journal is viewed along its longitudinal axis with the shortest angular distance from said primary crankpin to said secondary crankpin being in a clockwise direction, said intermediate main journal rotates in the clockwise direction;
   said intermediate main journal having a primary boundary plane extending between the longitudinal axis of said intermediate main journal and the outer surface of said intermediate main journal, said primary boundary plane being disposed between said primary and secondary crankpin planes, said primary boundary plane forming an angle of approximately 70 degrees with said primary crankpin plane;
   said intermediate main journal having a secondary boundary plane extending between the longitudinal axis of said intermediate main journal to the outer surface of said intermediate main journal, said secondary boundary plane being disposed between the sides of said primary and secondary crankpin planes which face away from said primary boundary plane, the angle, in degrees, between said secondary boundary plane and primary crankpin plane being equal to approximately 193 degrees minus the angle, in degrees, between said primary and secondary crankpin planes;
   a main cross passage extending through said intermediate main journal, said main cross passage having opposite ends which communicate with the outer surface of said intermediate main journal, said main cross passage being contained in a radial plane of said intermediate main journal, said main cross passage being oriented with respect to said primary and secondary crankpins so that the ends of said main cross passage are between the sides of said primary and secondary boundary planes which face said primary crankpin; and a primary connecting passage extending from said main cross passage through said one crankarm to the outer surface of said primary crankpin.

2. A crankshaft as set forth in claim 1 and further comprising:

a supplemental main passage extending from said main cross passage to the portion of the outer surface of said intermediate main journal between the sides of said primary and secondary boundary planes which face said primary crankpin, said supplemental main passage having an end which communicates with the outer surface of said intermediate main journal; and a secondary connecting passage extending from said supplemental main passage through said other crankarm to the outer surface of said secondary crankpin.

3. A crankshaft as set forth in claim 1 wherein:

a plane extending between the longitudinal axis of said intermediate main journal and one of said ends of said main cross passage forms an angle of approximately 90 degrees with said primary crankpin plane; and a plane extending between the longitudinal axis of said intermediate main journal and the other of said ends of said main cross passage forms an angle of approximately 60 degrees with said primary crankpin plane.

4. A crankshaft as set forth in claim 2 wherein:

a plane extending between the longitudinal axis of said intermediate main journal and one of said ends of said main cross passage forms an angle of approximately 90 degrees with said primary crankpin plane;

a plane extending between the longitudinal axis of said intermediate main journal and the other of said ends of said main cross passage forms an angle of approximately 60 degrees with said primary crankpin plane; and a plane extending between the longitudinal axis of said intermediate main journal and the end of said supplemental main passage is approximately coincident with said primary crankpin plane.

* * * * *